United States Patent
Rao et al.

(10) Patent No.: US 11,734,803 B2
(45) Date of Patent: Aug. 22, 2023

(54) SYSTEM AND METHOD FOR GENERATING HMI GRAPHICS

(71) Applicant: ABB Schweiz AG, Baden (CH)

(72) Inventors: Vidyadhar Rao, Andhra Pradesh (IN); Jinendra Gugaliya, Bangalore (IN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/550,167

(22) Filed: Dec. 14, 2021

(65) Prior Publication Data

US 2022/0188990 A1 Jun. 16, 2022

(30) Foreign Application Priority Data

Dec. 14, 2020 (EP) .................................... 20213812

(51) Int. Cl.
*G06T 5/00* (2006.01)
*G06V 20/62* (2022.01)

(52) U.S. Cl.
CPC .............. *G06T 5/005* (2013.01); *G06V 20/63* (2022.01); *G06T 2207/30108* (2013.01)

(58) Field of Classification Search
CPC .. G06F 8/34; G06F 8/70; G06F 9/451; G06N 3/0454; G06N 3/08; G06T 2207/30108; G06T 5/005; G06T 7/001
See application file for complete search history.

(56) References Cited

U.S. PATENT DOCUMENTS

| 2015/0105876 | A1  | 4/2015  | Tran et al.  |           |
|---|---|---|---|---|
| 2019/0318513 | A1  | 10/2019 | Ganapathi et al. |      |
| 2020/0057909 | A1  | 2/2020  | Priyadarsini et al. |   |
| 2020/0364387 | A1* | 11/2020 | Roemerman | G06F 30/20 |
| 2020/0372255 | A1* | 11/2020 | Fleisher   | G06N 3/082 |
| 2020/0380369 | A1* | 12/2020 | Case       | G06N 3/086 |
| 2020/0387550 | A1* | 12/2020 | Cappetta   | H04L 51/02 |

OTHER PUBLICATIONS

European Patent Office, Extended European Search Report in European Patent Application No. 20213812.9, 10 pp. (May 18, 2021).

* cited by examiner

*Primary Examiner* — Ming Wu
(74) *Attorney, Agent, or Firm* — Leydig, Voit & Mayer, Ltd.

(57) ABSTRACT

A computer-implemented method and arrangements for generating human machine interface, HMI, graphics associated with an industrial automation system implementing machine learning include receiving migrated HMI graphics. The migrated HMI graphics are obtained from a legacy HMI graphics and comprise a plurality of industrial objects. Further, the method comprises identifying a missing industrial object in said migrated HMI graphics using a historical labelled dataset comprising a plurality of labelled HMI graphics of the industrial object that comprises a graphical object and a data object. Once, the missing industrial object is identified the migrated HMI graphics is therefore corrected to include the identified missing industrial object and a corrected HMI graphics is generated. Furthermore, the method comprises transmitting a notification indicating the corrected HMI graphics to a computing device.

15 Claims, 14 Drawing Sheets

SYSTEM AND METHOD FOR GENERATING HMI GRAPHICS

CROSS-REFERENCE TO RELATED APPLICATIONS

This patent application claims priority to European Patent (EP) Application Ser. No. 20213812.9, filed on Dec. 14, 2020, which is incorporated herein in its entirety by reference for all purposes.

TECHNICAL FIELD

The present disclosure generally pertains to industrial automation systems. More particularly pertains to system and method for generating human machine interface (HMI) graphics associated with an industrial automation system implementing machine learning.

BACKGROUND OF THE DISCLOSURE

Industrial automation system comprises numerous sensors, actuators and controllers for monitoring and controlling the operations and process in an industry. Such controllers include applications with graphical displays for an operator to monitor operations of the industrial automation system. The graphical displays are provided on a computing device using a human machine interfaces (HMIs).

HMIs are commonly used connecting tools interfaced with the controllers. On need basis, HMIs exchange information between a human operator and a machine to orchestrate several industrial processes. The objective of HMI design is to enable operator to manage manufacturing processes with improved decision making while simultaneously preventing failure situations to reduce downtime. Hence, perceiving information and changes to information flows with contextual/situational data provides effective operator HMI design practices. The migration or upgradation strategy of an existing HMI design to a newest version depends on numerous factors like improved user interface, added features, and efficient communication. The major challenge here is to design and commission the target HMI graphics as efficiently and cost-effectively as possible.

There exist several HMI migration tools; however, these migration tools are not 100% accurate and manual intervention is needed to produce target HMI graphics. The manual verification task consumes significant amount of time. More particularly, when there are 300-400 HMIs to be intervened and manual intervening per HMI will consume enormous time and is prone to errors. Further, for complex HMI objects there are very large number of objects of different sizes and shapes that would be very tedious for manual validation and thus reduces the HMI migration efficiency. Hence, such manual solution may not be suitable during the HMI migration process and therefore there exists a need for an improved HMI migration arrangements that results in increasing the HMI migration efficiency and accuracy.

BRIEF SUMMARY OF THE DISCLOSURE

The inventors of the present invention have realized, after inventive and insightful reasoning that there are envisioned problems as more and more HMI graphics conversion needs to be realized in the future market as discussed above and below. The present disclosure seeks to disclose a system and method to infer and provide an efficient/automatic way of generating and/or converting the HMI graphics from one version to another e.g., from legacy to migrated HMI. The present disclosure provides a solution which seeks to mitigate, alleviate, or eliminate one or more of the above-identified deficiencies in the art and disadvantages singly or in any combination and to provide solutions an automatic/efficient mechanism for providing an improved HMI graphics during the HMI migration.

A first aspect is a computer-implemented method for generating HMI graphics associated with an industrial automation system. The method comprises receiving a migrated HMI graphics. The migrated HMI graphics being obtained from a legacy HMI graphics and that the migrated HMI graphics comprises a plurality of industrial objects. Further, the method includes identifying a missing industrial object in said migrated HMI graphics using a historical labelled dataset comprising a plurality of labelled HMI graphics of the industrial object that comprises a graphical object and a data object. Once, the missing industrial object is identified the migrated HMI graphics is therefore corrected to include the identified missing industrial object and a corrected HMI graphics is generated and outputted to the system. In some aspect, a notification indicating the corrected HMI graphics is transmitted to the computing device or any other portable device of the operator operating the industrial operating system or any concern individual.

In some embodiments, the industrial object in the legacy HMI graphics is associated with an older version of the industrial automation system/industrial devices and the industrial object(s) in said migrated HMI graphics is associated with a newer version of the industrial automation system/industrial devices.

In some embodiments, the at least one missing industrial object indicates that at least one industrial object is missed in a scene of the migrated HMI graphics (118).

In some embodiments, the method for identifying the missing object in the migrated HMI graphics comprises identifying the industrial object in both the migrated HMI graphics and legacy HMI graphics using object recognition techniques. The method further comprises determining the differences between the identified industrial object in both the migrated HMI graphics and legacy HMI graphics and identifying the missing industrial object in the migrated HMI graphics based on said determined differences and using the historical HMI labelled dataset of the at least one industrial object.

In some embodiments, the accuracy of a corrected HMI graphic comprising the industrial objects is evaluated using the historical HMI labelled dataset that comprises a plurality of labelled HMI graphics (or images) of the industrial objects. In some aspect, the historical HMI labelled dataset may be obtained based on domain knowledge/domain experts.

In some embodiments, the method for identifying the missing object in the migrated HMI graphics comprises obtaining the placeholder in the migrated HMI graphics, detecting the location of the missing industrial object in the migrated HMI graphics based on the placeholder and creating the bounding boxes around the identified placeholder.

In some embodiments, the bounding boxes are created using a template matching and image-processing techniques.

In some embodiments, the method further comprises evaluating the identified missing industrial object using a one-to-one mapping between the pluralities of the industrial objects. In some aspect, the one-to-one mapping model utilizes the image-processing technique in accordance with the historical HMI labeled dataset comprising the plurality of labelled HMI graphics of the industrial objects/devices.

A second aspect is an industrial automation system implementing machine learning for generating HMI graphics. The industrial automation system comprising a processor, a memory and a graphic object detection model, coupled to the processor and the memory. The graphic object detection model is configured to receive a migrated HMI graphics. The migrated HMI graphics being obtained from a legacy HMI graphics and that the migrated HMI graphics comprises a plurality of industrial objects. Further, the graphic object detection model is configured to identify a missing industrial object in said migrated HMI graphics using a historical labelled dataset comprising a plurality of labelled HMI graphics of the industrial object that comprises a graphical object and a data object. Once, the missing industrial object is identified the migrated HMI graphics is therefore corrected to include the identified missing industrial object and a corrected HMI graphics is generated and outputted. In some aspect, a notification indicating the corrected HMI graphics is also transmitted to the computing device or any other portable device of the operator operating the industrial operating system or any concern individual.

Advantageously, some embodiments provide an automatic correction of the HMI graphics (i.e., legacy HMI) where, otherwise, a manual effort is required to correct the HMI graphics (i.e., migrated HMI graphics) during the HMI migration process.

Advantageously, some embodiments improve the efficiency and accuracy of the HMI migration by implementing the machine learning and image processing techniques.

Advantageously, some embodiments leverage the industrial domain knowledge and machine vision based intelligence for auto verification and correction of the HMI graphics, during the HMI migration.

BRIEF DESCRIPTION OF THE SEVERAL VIEWS OF THE DRAWING(S)

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

Figure 5:
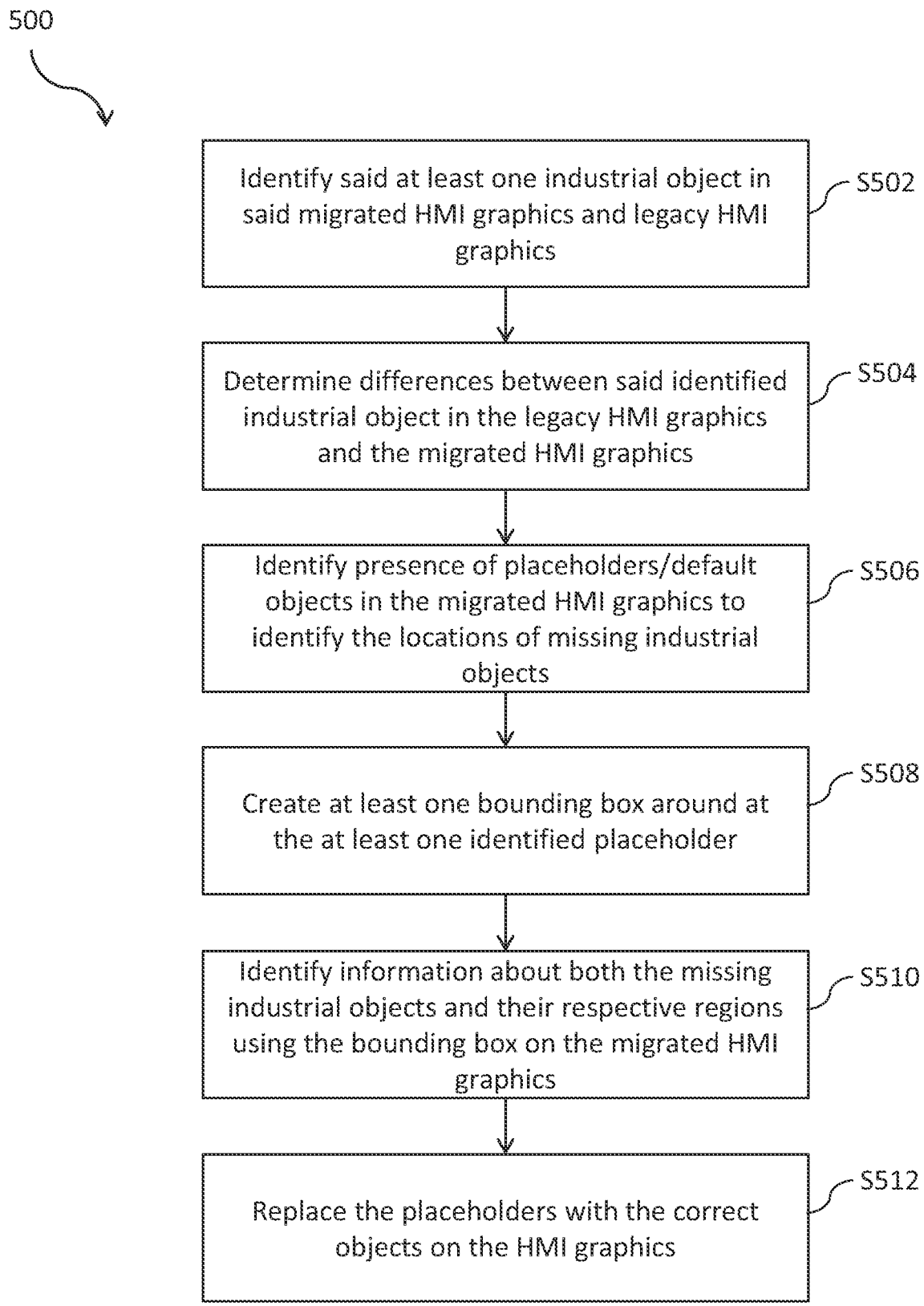

FIG. 5 is a flow diagram schematically depicting a process for identifying and inpainting the missing industrial object on to a migrated HMI graphics, according to some of the example embodiments; and FIGS. 6A, 6B, 6C, 7A, 7B, 7C, 8A, 8B, and 8C are example scenarios of HMI graphics migration from legacy HMI graphics to migrated HMI graphics and further to the corrected HMI graphics, according to some of the example embodiments.

DETAILED DESCRIPTION OF PREFERRED EMBODIMENT(S)

Aspects of the present disclosure will be described more fully hereinafter with reference to the accompanying drawings. The system and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only and is not intended to limit the invention. As used herein, the singular forms "a", "an" and "the" are intended to include the plural forms as well, unless the context clearly indicates otherwise.

Some of the example embodiments presented herein are directed towards system and method for generating HMI graphics associated with an industrial automation system implementing machine learning. As part of the development of the example embodiments presented herein, a problem will first be identified and discussed.

HMI migration tools are used to convert/migrate the HMI graphics form one version to another version. However, these HMI migration tools are not 100% accurate and manual intervention is needed to produce the target HMI graphics. Further, the manual corrections are provided to the target HMI graphics in order to make them look aesthetically good with proper alignments including each graphics elements & their resolutions, keeping accurate transformation of static & dynamic info, etc. Such formatted HMI needs to be manually reviewed and corrected for any discrepancy, which reduces the HMI migration efficiency.

Advantageously, some embodiments, aims at improving the HMI graphics migration efficiency and accuracy by enabling the automation intervention of the migrated HMI graphics that automatically verifies and corrects the discrepancy in the HMI graphics.

Advantageously, some embodiments, provide adequate support for migration of complex legacy graphical objects, reduced migration effort and costs, more automation and less manual engineering work and improved consistency among the HMI graphics.

Advantageously, some embodiments, enables to leverage the industrial domain knowledge during the HMI conversion and machine vision based intelligence for auto verification and correction of the HMI graphics.

Advantageously, some embodiments, provide a benchmark platform for comparison of HMI migration tools. That is, a construction of comparison function between any two arbitrary HMI migration tools is provided.

Figure 1A:
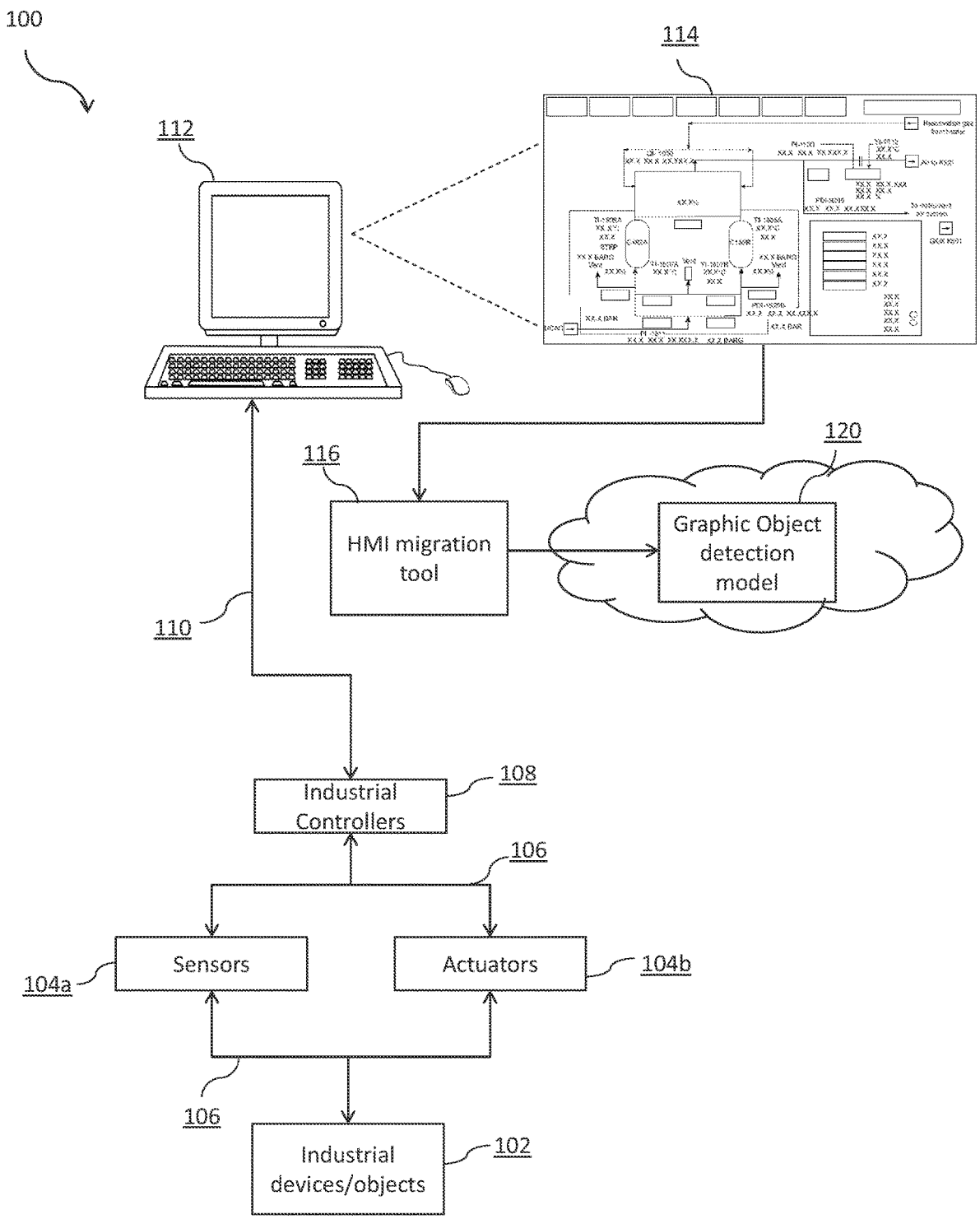
FIGS. 1A and 1B are block diagrams illustrating embodiments of an industrial automation system.
Figure 1B:
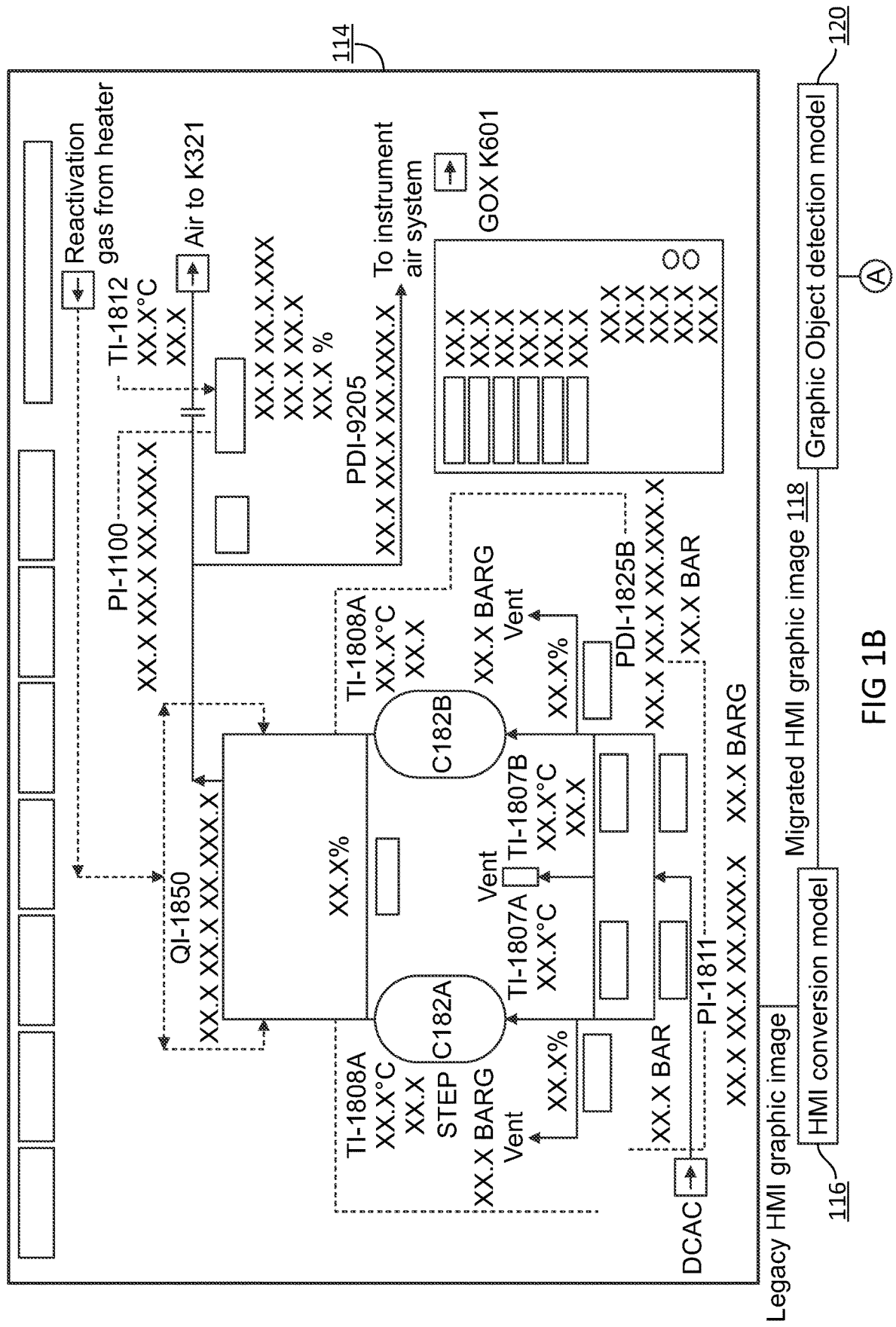
Figure 1B:
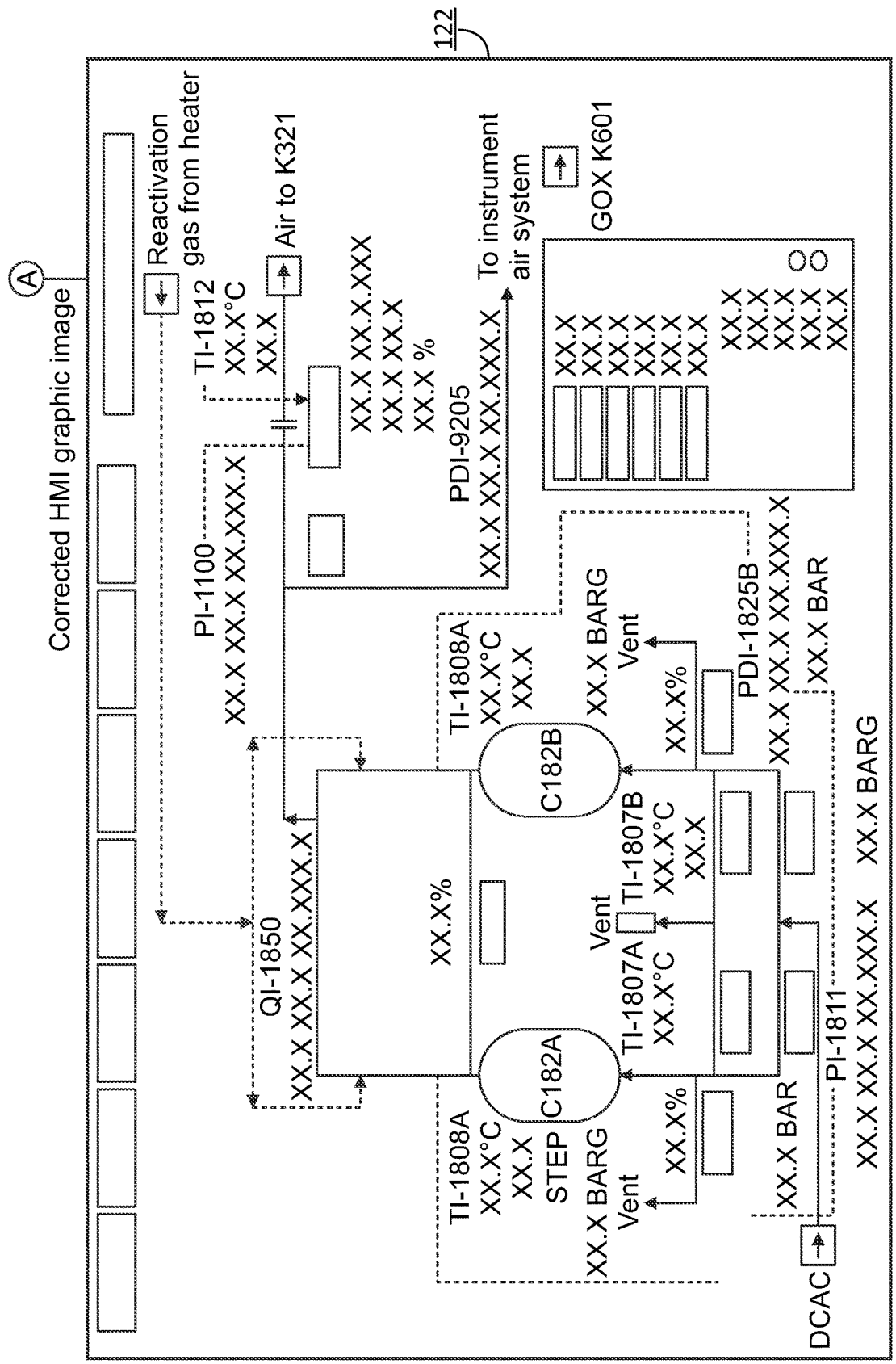

As shown in FIG. 1, the industrial automation system 100 is used to control the plurality of industrial devices/components that are responsible for handling different process and machineries in multiple industrial plants (or any technical installation). For example, a process control in manufacturing a product (i.e., insulators in an insulator manufacturing plant) requires continuous monitoring of the industrial devices/components such as, for example, pumps, valves, motors, boilers, turbines and Generator (BTG) that are required in processing raw materials (for example, clay, porcelain, etc.) during the manufacturing of the insulators. This continuous monitoring of the industrial devices/components in such multiple industrial plants is facilitated by the industrial automation system 100. Each industrial plant represent/indicate one or more manufacturing facilities for producing the at least one product (i.e., insulators) or other material.

The industrial automation system 100 includes a plurality of industrial devices 102 (or industrial objects) that are responsible for controlling/monitoring and/or manufacturing the product (e.g., insulators) or the material. The industrial automation system 100 further includes one or more sensors 104a and one or more actuators 104b. The sensors 104a and the actuators 104b are communicatively coupled to the plurality of industrial devices 102. In some aspect, the sensors 104a may measure/monitor a configuration and/or operating readings of the industrial devices 102. The configuration and/or operating readings, such as for example, temperature, pressure, current flow rate and further triggers an alarm in case of any abnormalities while reading/monitoring such configuration and/or operating readings. In some aspect, the actuators 104b are responsible to drive the operating function of the industrial devices 102. For example, the actuator 104b may be responsible to shutting down the valves in case of the alarm by the sensors 104a. Thus, each of the actuators 104b is responsible for operating one or more conditions of the industrial devices 102 in the industrial automation system 100.

In some aspects, the connection between the sensors 104a/the actuators 104b and the plurality of industrial devices 102 is via a network interface 106 such as, for example, Ethernet network, electrical signal network, Bluetooth, or any other or type(s) of network(s). In some other aspect, the network interface 106 between the sensors 104a and the actuators 104b aids in communicating the data between the sensors 104a and the actuators 104b.

All the measurements from the sensors 104a and the actuators 104b are communicated to industrial controllers 108 via the network interface 106. In some aspect, the industrial controllers 108 can include, for example, a distributed control system (DCS), programmable logic controller (PLC), proportional-integral-derivative (PID) controllers, etc. In one example, each controller 108 may also represent a computing device. The controllers 108 are responsible to control the operations of the sensors 104a and the actuators 104b. For example, the controllers 108 may leverage the data obtained from the sensors 104a in order to operate the actuators 104b. In some other aspect, the controllers 108 may be used to control/create/modify a configuration of the sensors 104a and the actuators 104b. In some other aspect, the controllers 108 can be configured to create and control a logical connection between each of the sensors 104a and between each of the actuators 104b. In addition, the controllers 108 can control the configuration and/or connection between each of the sensors 104a/actuators 104b and the industrial components 102.

Each controller 108 may also be responsible for controlling one or more aspects of an industrial process. For example, controlling the operations of the boiler that is used in processing the raw material such as clay for manufacturing the insulators.

An operator of the industrial automation system 100 can access and interacts with the controllers 108 using a human machine interface (HMI) 110. In some aspect, the controllers 108 may have a HMI embedded/installed (not shown) within the controllers 108. The access and interaction with the controllers 108 can be executed via a computing device 112. The access with the controllers 108, in some aspect, may include for example accessing the connection and configuration of the sensors 104a, the actuators 104b and some of the industrial devices 102. Further, the interaction with the controllers 108, in some aspect, may include for example identifying different state of the industrial process, such as state of the alarm, operating values of various industrial devices 102, etc.

Figure 7A:
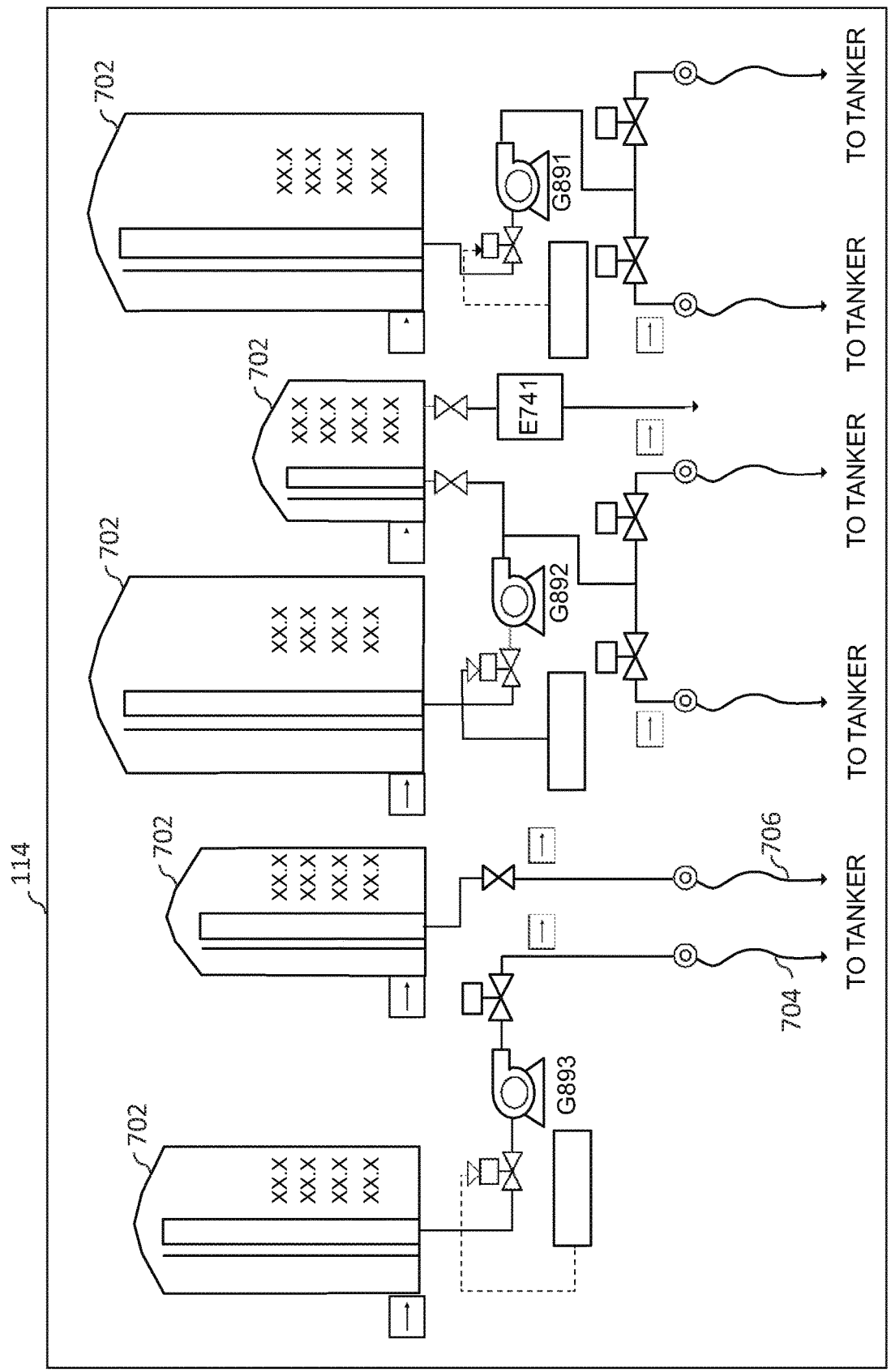
Figure 7B:
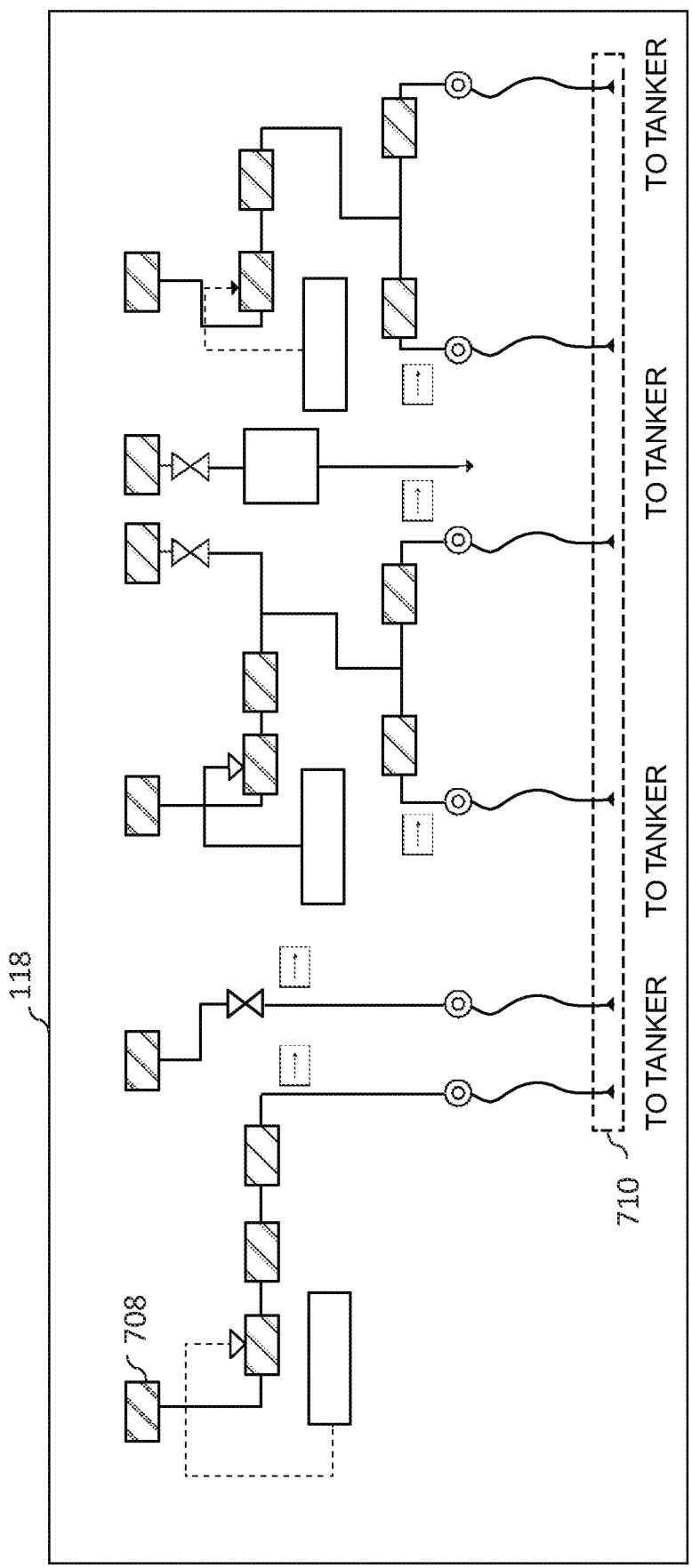
Figure 7C:
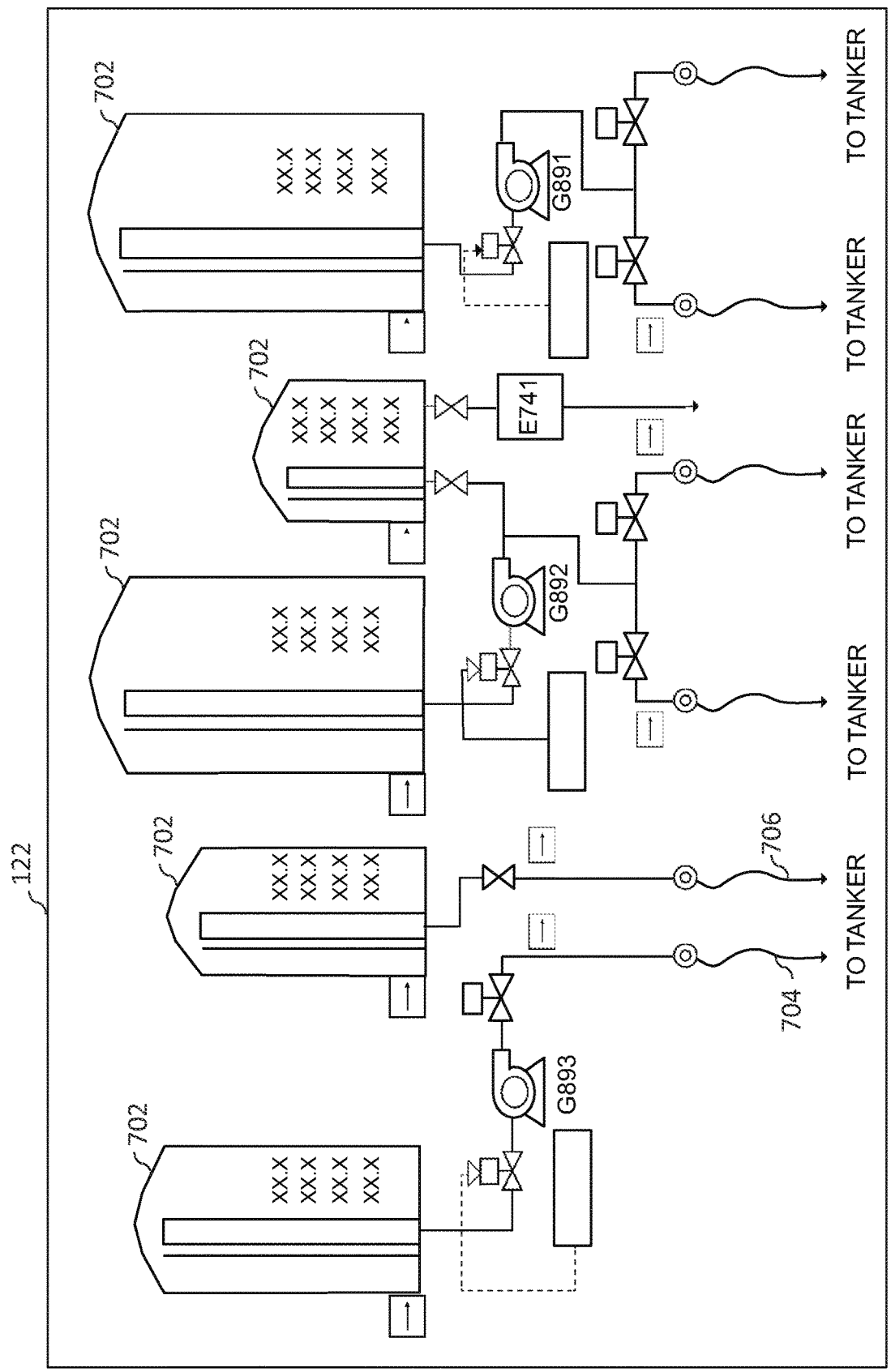

In some aspect, the computing device 112 can include, for example, any computer such as standalone computer, laptops, personal computer (PC), multiple display screens, computer tablets, portable devices, and the like. The computing device 112 may include a display unit and a graphics processing units (GPU) configured for processing and displaying graphical images (for example, HMI graphics 114) of the industrial devices 102 and connection between each industrial component 102. In an example, the HMI graphics 114 indicates a graphical form of a connection between each of the industrial objects 102 and each of the sensors 104a/actuators 104b is also displayed by the computing device 112. Further, the HMI graphics 114 indicates process lines representing process connections, instrument lines indicating the process taping or point of measurement, control connections, and the like. Each industrial component 102 may be represented/graphically displayed uniquely onto the display unit of the computing device 112 using the HMI. For example, each actuator 104b can be represented as a valve as a graphic and each sensor 104a as gauge (as shown in FIGS. 7A-7C).

As discussed, each industrial component 102 may be represented/graphically displayed uniquely onto the display unit of the computing device 112 and thus similarly each controllers 108 (or each version of operating firmware of the controllers 108) comprises own library of HMI graphics distinct to other controllers or to a version of operating firmware of the other controllers. Hence, a migration of the HMI graphics is always necessitated whenever the version of the controllers 108 are migrated to other controllers or migrated to a newer/updated version of the operating firmware. In some aspects, a HMI graphic conversion model/HMI migration tool 116 can be used to convert or migrate the legacy HMI graphics 114 to a new HMI graphics (i.e., migrated HMI graphics 118, shown in FIG. 1B) in order to provide an enhanced user interface experience.

The migration or upgradation strategy of the legacy HMI graphics 114 design to the migrated HMI graphics 118 depends on numerous factors like improved user interface, added features, and efficient communication. The major challenge here is to design and commission a target HMI graphics (final HMI graphics) as efficiently and cost-effectively as possible. Existing/conventional HMI graphic conversion tools migrates the graphical data from one HMI to another. However, an incumbent HMI graphic migration tool may not have all the capabilities of migration from legacy HMI graphics to new HMI graphics due to dynamic nature of functional specifications in greenfield applications. Most of the HMI graphic migration tools are still not accurate due to incorrect symbol or tag mappings. Hence, a manual intervention is required to fix inaccuracies (which increases the chances for errors) in formatting the target HMI graphics. Such manual effort can be expensive and does not allow the user to reap the full benefits of automated translation.

Unlike to conventional mechanism used for migrating HMI graphics, the present invention seeks to implement/incorporate the machine learning mechanism to automatically identify the inaccuracies (i.e., missing industrial graphic objects) in the migrated HMI graphics during the HMI conversion process.

In order to achieve the desired technical effect of the present invention that is to automatically identify the inaccuracies in the migrated HMI graphics during the HMI conversion process, the present invention seeks to provide a graphic object detection model 120 (interchangeably used as a HMI graphic object detection model 120) configured to perform the proposed method. In some aspect, the graphic object detection model 120 is configured to obtain the migrated HMI graphics 118 (an output of the HMI migration tool 116). The graphic object detection model 120 is then configured to automatically identify the inaccuracies in the migrated HMI graphics 118 and correct the inaccuracies in the migrated HMI graphics 118. Once corrected, the graphic object detection model 120 can be configured to output a corrected HMI graphics 122 (i.e., including all the industrial graphic objects and textual information present in the legacy HMI graphics 114), as shown in FIG. 1B, thereby enhancing the HMI migration accuracy and efficiency.

In some aspect, the graphic object detection model 120 can be hosted on a cloud-computing server and can be accessed by the operator/individual using any suitable network interface. In some other aspect, the graphic object detection model 120 can be a part of the HMI migration tool 116.

In some aspect, the present invention provides a benchmark platform for comparison of HMI conversion tools i.e., the HMI migration tool 116 (integrated with the graphic object detection model 120) with any other HMI migration tool (not shown). For example, a comparison function between any two arbitrary HMI conversion tools, is constructed, using: a) utilizing the HMI conversion tool 116 to identify the missing graphic objects and textual information on the migrated HMI graphics 118 b) repeat the step a) using other HMI migration tool. Further, the missing information is collated (at step c)) on the display unit of the computing device 112 to compare the HMI migration tool 116 and other migration tool. A dashboard gives a detailed analysis on the computing device 112 to display the legacy HMI graphics 114 from legacy system, and the options to select between the two HMI migration tools. The output of the comparison after executing the above steps a, b and c is displayed onto the display unit of the computing device 112. Hence, the benchmark platform indicates the comparison across HMI migration tools that can be effectively used by the developers, designers, and operators for analysis and comparison across HMI migration tools.

Figure 2:
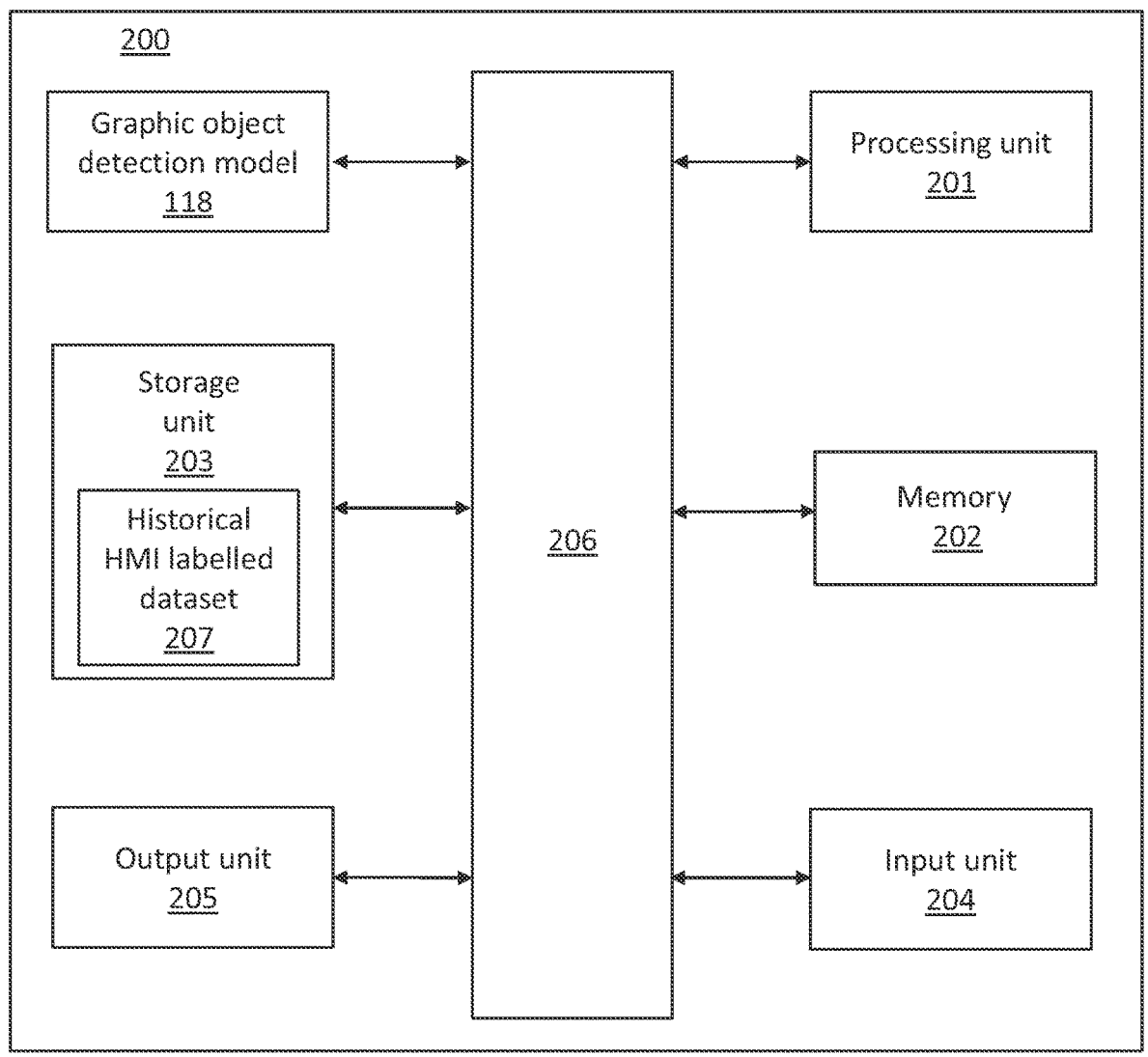
FIG. 2 is a block diagram illustrating a computing environment implementing the industrial automation system of FIG. 1A.

Referring to FIG. 2, a computing environment 200 may include processing unit 201, one or more memory devices 202 (referred to herein as memory 202), storage unit 203, an input unit 204, and an output unit 205. The computing environment 200 may further include one or more buses 206 that functionally couple various components of the computing environment 200.

The memory 202 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory. In certain example, the storage unit 203 may be equivalent to the memory 202. In various implementations, the memory 202 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 202 may include main memory as well as various forms of cache memory such as instruction cache(s), data cache(s), and translation lookaside buffer(s) (TLBs), and so forth. Further, cache memory such as a data cache may be a multi-level cache organized as a hierarchy of one or more cache levels (L1, L2, etc.).

The storage unit 203 may include removable storage and/or non-removable storage including, but not limited to, magnetic storage, optical disk storage, and/or tape storage. The storage unit 203 may provide non-volatile storage of computer-executable instructions and other data. The storage unit 203 and the memory 202, removable and/or non-removable, are examples of computer-readable storage media (CRSM).

In some aspect, the storage unit 203 stores a historical HMI labelled dataset 207. The historical HMI labelled dataset 207 comprises a plurality of labelled HMI graphics of the industrial objects 102. The labelled HMI graphics are based on industrial domain knowledge (obtained from various sources such as for example, industrial domain expert's portal, online industrial domain portal, industry specific domain portal, and the like). For example, the industrial domain knowledge may include all the information about both the missing graphics objects in the migrated HMI graphics 114 and their respective regions on the migrated HMI graphics 114.

Thus, the present invention leverages the industrial domain knowledge (i.e., historical HMI labelled dataset 207) during the HMI graphics conversion and the machine learning (or machine vision) based intelligence for auto verification and correction of the HMI graphics.

The storage unit 203 may store computer-executable code, instructions, or the like that may be loadable into the memory 202 and executable by the processing unit 201 to cause the processing unit 201 to perform or initiate various operations. The storage unit 203 may additionally store data that may be copied to memory 202 for use by the processing unit 201 during the execution of the computer-executable instructions. Moreover, output data generated as a result of execution of the computer-executable instructions by the processing unit 201 may be stored initially in memory 202 and may ultimately be copied to storage unit 203 for non-volatile storage.

More specifically, the storage unit 203 may store an operating systems (O/S); the database 102 configured to access the memory 202; and one or more program module, applications, engines, managers, computer-executable code, scripts, or the like such as, for example, the various module of the graphic object detection model 120. Any of the components depicted as being stored in storage unit 203 may include any combination of software, firmware, and/or hardware. The software and/or firmware may include computer-executable instructions (e.g., computer-executable program code) that may be loaded into the memory 202 for execution by one or more of the processing unit 201 to perform any of the corresponding operations described earlier.

The processing unit 201 may be configured to access the memory 202 and execute computer-executable instructions loaded therein. For example, the processing unit 201 may be configured to execute computer-executable instructions of the various program module, applications, engines, managers, or the like of the graphic object detection model 120 to cause or facilitate various operations to be performed in accordance with one or more embodiments of the disclosure. The processing unit 201 may include any suitable processing unit capable of accepting data as input, processing the input data in accordance with stored computer-executable instructions, and generating output data. The processing unit 201 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processing unit 201 may have any suitable microarchitecture design that includes any number of constituent components such as, for example, registers, multiplexers, arithmetic logic units, cache controllers for controlling read/write operations to cache memory, branch predictors, or the like. The microarchitecture design of the processing unit 201 may be capable of supporting any of a variety of instruction sets.

The input unit 204 and the output unit 205 may facilitate the receipt of input information by the graphic object detection model 120 from one or more I/O devices as well as the output of information from the graphic object detection model 120 to the one or more I/O devices. The I/O devices may include any of a variety of components such as a display or a display screen having a touch surface or a touchscreen; an audio output device for producing sound, such as a speaker; an audio capture device, such as a microphone; an image and/or video capture device, such as a camera; a haptic unit; and so forth. Any of these components may be integrated into the components of the computing environment 200 or only into the industrial automation system 100 or may be separate. The I/O devices may further include, for example, any number of peripheral devices such as data storage devices, printing devices, and so forth. The input unit 204 and the output unit 205 may also include an I/O interface for an external peripheral device connection such as universal serial bus (USB), FireWire, Thunderbolt, Ethernet port or other connection protocol that may connect to one or more networks.

The I/O interface(s) may also include one or more connection ports to connect one or more controllers 108, interface for network cables and to connect other computing devices (similar to the computing device 112). The connections to the ports can be via electrical signal cables, HMI cables, and the like. Further, the I/O interface(s) may additionally comprises one or more antennas to connect to one or more networks via local area network (LAN) or optionally via a wireless local area network (WLAN) (such as Wi-Fi) radio, Bluetooth, and/or a wireless network radio.

The bus(es) 206 may include at least one of a system bus, a memory bus, an address bus, or a message bus, and may permit the exchange of information (e.g., data (including computer-executable code), signaling, etc.) between various components of the visual perception module 103. The bus(es) 206 may include, without limitation, a memory bus or a memory controller, a peripheral bus, an accelerated graphics port, and so forth.

Figure 3:
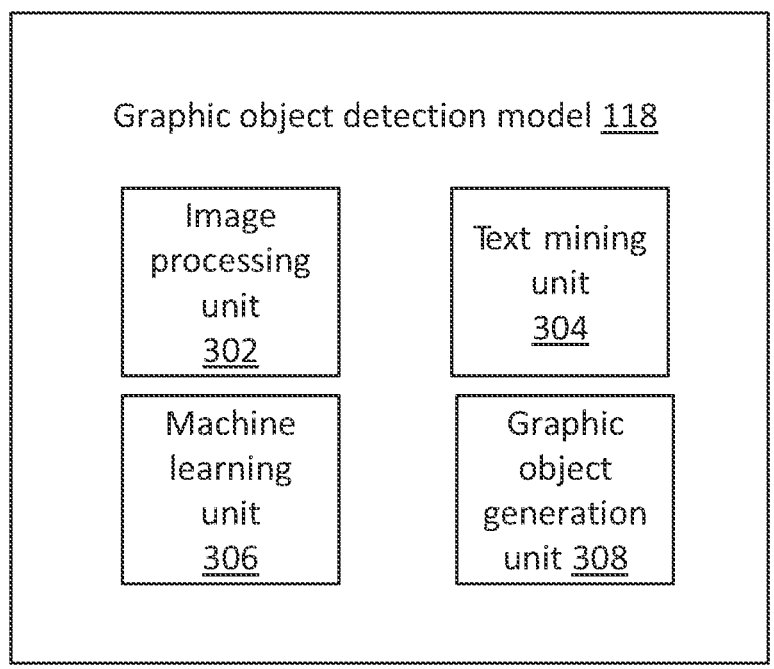
FIG. 3 is an example configuration of a graphic objection detection model of the industrial automation system of FIG. 1A, according to some of the example embodiments.

Referring to FIG. 3, the graphic object detection model 120 may comprise an image-processing unit 302, a text-mining unit 304, a machine learning (ML) unit 306 and a graphic object generation unit 308.

The graphic object detection model 120 can be configured to receive, using the image-processing unit 302, the migrated HMI graphics 118 from the HMI migration tool 116. The migrated HMI graphics 118 being obtained from the legacy HMI graphics 114. That is, the migrated HMI graphics 118 is an output HMI graphics from the HMI migration tool 116 (responsible for migrating the legacy HMI graphics 114). In some aspect, the migrated HMI graphics 118 comprises one or more industrial objects 102 in form of a graphical object or a data object. The graphical objects can be include, for example, a graphical representation of the sensors 104a, the actuators 104b, the industrial objects 102 (such as boiler, pumps, etc.) and the connectors (or indicators such as an arrow indicators) between the industrial objects 102 and between the sensors 104a and the actuators 104b. Further, the data object can include, for example, text or any numbers associated with each graphical representation of the sensors 104a, the actuators 104b and the industrial objects 102. This is shown, as example, in form of the legacy HMI graphics 114 and corrected HMI graphics 122.

Further, the HMI graphic object detection model 120 can be configured to identify one or more missing industrial object in the migrated HMI graphics 118. The components of the graphic object detection model 120, such as the image-processing unit 302, the text-mining unit 304 and the machine learning (ML) unit 306, communicates with the storage unit 203 to utilize the historical HMI labelled dataset 207 during the identification of the missing industrial object in said migrated HMI graphics 118.

In some aspect, the image-processing unit 302 can be configured to identify the missing industrial objects and corresponding locations of the missing industrial objects in the migrated HMI graphics 118 based on the object recognition techniques that identifies the HMI graphic objects in both the legacy HMI graphics 114 and the migrated HMI graphics 118. According to an aspect of the present invention, in order to find the missing industrial objects in the migrated HMI graphics 118, the image-processing unit 302 can be configured to determine the differences between the identified industrial objects in the legacy HMI graphics 114 and the migrated HMI graphics 118 using the image mapping.

In some aspect, the location of the missing industrial objects in the migrated HMI graphics 118 can be obtained by detecting the presence of placeholders/default objects in the migrated HMI graphics 118. The placeholders/default objects in the migrated HMI graphics 118 is obtained during the conversion of the legacy HMI graphics 114. That is, when the legacy HMI graphics 114 is converted, using the HMI migration tool 116, the converted HMI graphics (i.e., migrated HMI graphics 118) comprises one or more placeholders/default objects indicating the missing industrial objects.

In some aspect, the image-processing unit 302 can be configured to obtain the bounding boxes around the placeholders/default objects using a combination of template matching and image processing methods/models. The bounding boxes indicates the location of the missing industrial objects in the migrated HMI graphics 118 and may serve as an input to the ML unit 306. For example, the bounding box is placed around the placeholder and these are potential regions (input) for the ML unit 306 to identify the missing industrial objects. In some aspect, pixel input associated with the legacy HMI graphics 114 in regions enclosed by the bounding boxes, is obtained by the ML unit 306 for detecting the possible industrial objects that is missing in the migrated HMI graphics 118.

In some aspect, the ML unit 306 implements convolutional neural network (CNN) models to identify a relationship between the industrial objects 102 of the industrial automation system 100 using the historical HMI labelled dataset 207. The image-processing unit 302 communicates with the ML unit 306 that implements the NN. The ML unit 306 can be configured to classify the industrial objects 102 (identified from the image-processing unit 302) in both the legacy HMI graphics 114 and the migrated HMI graphics 118 using the historical HMI labelled dataset 207. In one example, a semantic information of the industrial objects 102 is determined from the historical HMI labelled dataset 207 in that the semantic information includes relationships between the industrial objects 102, contextual connection between the industrial objects 102 and the like. In some embodiments, the ML unit 306 implementing the CNN models are trained using the historical HMI labelled dataset 207. In some other embodiments, the ML unit 306 implementing the CNN models can be trained using historical data of the automation HMI objects with associated labels and cross-trained using historical labelled data associated with automation HMI objects. For example, the labelled data associated with automation HMI objects may also be generated by a user input based on at least one feedback stimuli. In yet another embodiment, the ML unit 306 implementing the CNN models can be trained using unlabelled historical data of the automation HMI objects and cross-trained using labelled historical data associated with automation HMI objects.

In addition with semantic mapping of the industrial objects 102 and their respective regions/locations on the migrated HMI graphics 118, the HMI graphic object detection model 120 utilizes the 1-to-1 mapping to identify the correct industrial objects to be placed in the migrated HMI graphics 118. That is, the HMI graphic object detection model 120 replaces the placeholder (indicated by the bounding boxes) with the correct industrial objects in the migrated HMI graphics 118.

Thus, the missing industrial objects in a designated region of the migrated HMI graphics 118 can be automatically restored thereby reducing the manual efforts or manual intervention. Consequently, significant time can be reduced by reducing the manual efforts.

In some aspect, the text-mining unit 304 can be configured to identify the missing textual or data content along with their bounding boxes in the migrated HMI graphics 118. For example, the text-mining unit 304 implements a scene-text recognition technique/model to identify the missing textual or data content in the migrated HMI graphics 118.

Figure 4:
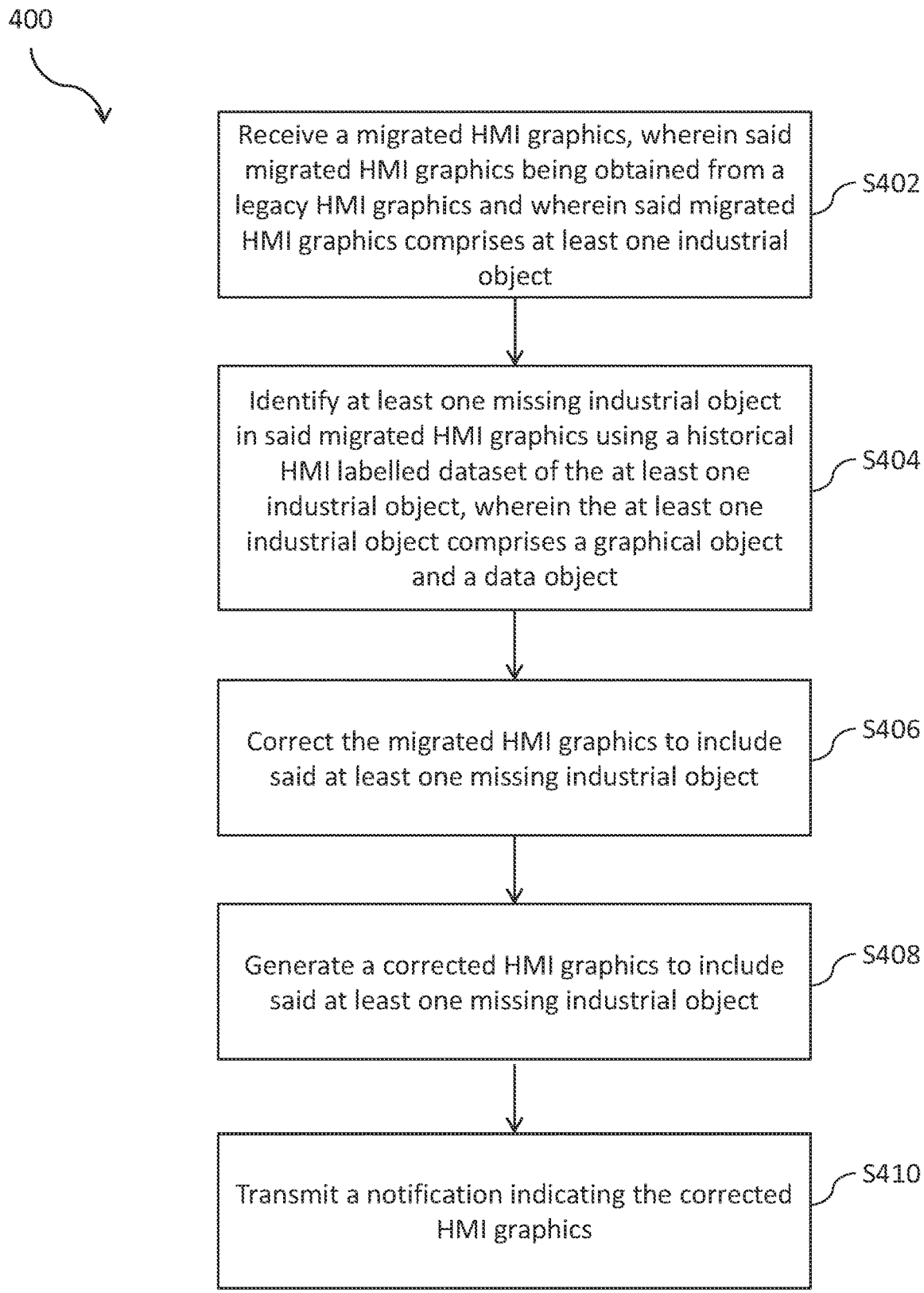
FIG. 4 is a flow diagram schematically depicting a proposed method, according to some of the example embodiments.

In view of the above, FIG. 4 illustrates an example method 400 implemented by the HMI graphic object detection model 120. According to the method 400, the migrated HMI graphics 118 is obtained from the legacy HMI graphics 114 (as detailed above). The HMI graphic object detection model 120 then receives the migrated HMI graphics 118 (at block S402). The migrated HMI graphics 118 comprises at least one industrial object.

According to the method 400, the at least one missing industrial object, in the migrated HMI graphics 118, is identified using the historical HMI labelled dataset 207 of the at least one industrial object (at block S404). The at least one industrial object comprises the graphical object and the data/textual object.

According to the method 400, the migrated HMI graphics 118 is corrected to include at least one missing industrial object (at block S406). Further, according to the method 400, the corrected HMI graphics is generated, where the corrected HMI graphics 122 incorporates the at least one missing industrial object (at block S408).

According to the method 400, a notification indicating the corrected HMI graphics 122 is transmitted (at block S410) to the computing device 112. The notification can include, for example, an alarm, a sound notification such as beep or any other as configured by the computing device 112 or a user-desired configuration.

In view of the above, FIG. 5 illustrates an example method 500 implemented by the HMI graphic object detection model 120 for identifying and inpainting the missing industrial objects in the migrated HMI graphics 118. According to the method 500, the at least one industrial objects 102 in said migrated HMI graphics 118 and legacy HMI graphics 114 is identified (at block S502). The object recognition model can be used for such identification of the industrial objects 102.

Further, according to the method 500, the differences between the identified industrial object in the legacy HMI graphics 114 and the migrated HMI graphics 118 is determined (at block S504).

Further, according to the method 500, the presence of placeholders/default objects in the migrated HMI graphics 118 is identified (at block S506). The placeholders/default objects can be used to identify the locations of missing industrial objects in the migrated HMI graphics 118. In some aspect, the placeholders/default objects are directly obtained from the migrated HMI graphics 118 that also indicates the one or more industrial objects are missing (in a particular region) in comparison to the one or more industrial objects in the legacy HMI graphics 114.

Further, according to the method 500, the at least one bounding box is created around at the at least one identified placeholder (at block S508). To obtain the bounding boxes for default objects or placeholders, the HMI graphic object detection model 120 utilizes a combination of template matching and image processing techniques.

Further, according to the method 500, information about both the missing industrial objects and their respective regions using the bounding box on the migrated HMI graphics 118 is identified (at block S510). This can be achieved by using the ML unit 306 that utilizes the 1-to-1 mapping to identify (using the historical HMI labelled dataset 207) the correct industrial objects to be placed in the migrated HMI graphics 118.

Further, according to the method 500, the placeholder is replaced with the correct industrial object on the migrated HMI graphics 118 (at block S512).

Figure 6A:
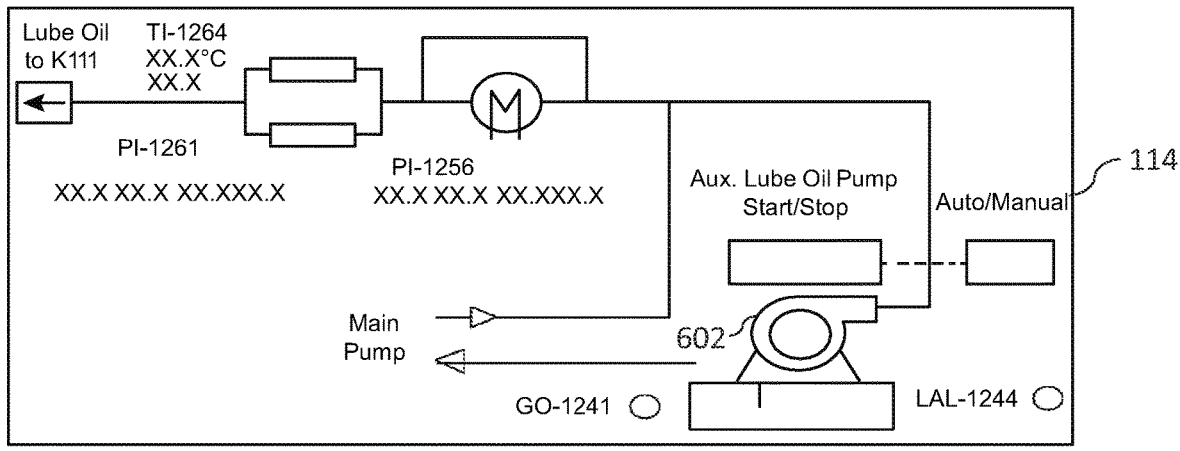

Referring to FIG. 6A, the legacy HMI graphics 114 illustrates a graphical form of an industrial object i.e., main pump 602 on the computing device 112 of the industrial automation system 100. The legacy HMI graphics 114 also illustrates a graphical form of other industrial objects including the processing lines, connection lines and any textual data associated with the industrial objects on the computing device 112 of the industrial automation system 100.

In some aspects, the legacy HMI graphics 114 is transmitted (as an input) to the HMI migration tool 116 for the purpose of the HMI migration. The output from the HMI migration tool 116 can be represented as the migrated HMI graphics 118 (as illustrated in FIG. 6B).

Figure 6B:
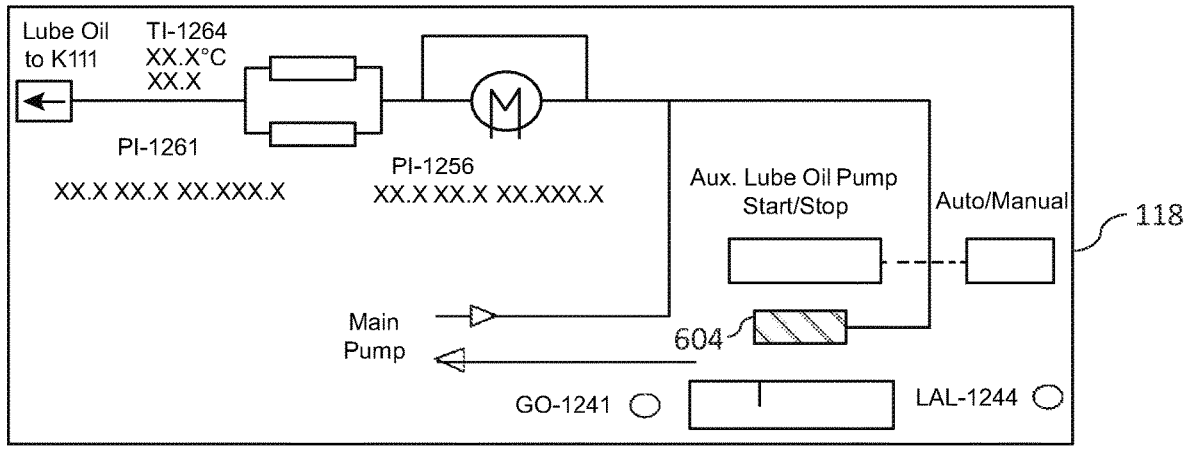

Referring to FIG. 6B, the migrated HMI graphics 118 illustrates a migrated graphical form of the industrial objects 102. As discussed above, these HMI migration tools are not 100% accurate and manual intervention is needed to produce the target HMI graphics. For example, as illustrated in FIG. 6B, the industrial object i.e., main pump 602 is missing in the migrated HMI graphics 118. Hence, according to the conventional method, a manual inspection is executed on the migrated HMI graphics 118 to identify the missing industrial object i.e., main pump 602. Such manually reviewing/inspection of the formatted HMI and further manual correction for the discrepancy (missing industrial object), reduces the HMI migration efficiency.

Unlike to such conventional method, the proposed method utilizes the historic HMI labelled images (of the industrial objects) to train the HMI graphic object detection model 120, using machine learning techniques, for auto verification and correction of any discrepancy in the migrated HMI graphics 118. Further, the proposed method also utilizes the object recognition models to resolve conflicts due to ambiguous or nearly-similarly looking industrial objects in the migrated HMI graphics 118.

Referring back to FIG. 6B, the HMI graphic object detection model 120 creates a bounding box 604 in place of the default objects/placeholder indicating the missing main pump 602. The HMI graphic object detection model 120 then performs the 1-to-1 mapping to identify the correct objects to be placed in the migrated HMI graphics 118 using the machine learning techniques and historic HMI labelled dataset 207 (comprising the plurality of HMI labelled images of the industrial objects). The placeholder, herein, indicates a location of the missing industrial object.

Once the correct industrial object, to be placed on the migrated HMI graphics 118, is identified the HMI graphic object detection model 120 replaces/restores the placeholders with the correct industrial object on the migrated HMI graphics 118. For example, referring to FIG. 6C, the missing main pump 606 replaces the placeholder/default object of the bounding box 602. The corrected HMI graphics 122 is then transmitted for the further addition/inspection (to meet the additional client requirements) and to constitute the target HMI graphic.

Similar to FIG. 6A, the FIG. 7B illustrates the legacy HMI graphics 114 comprising a graphical form of an industrial objects i.e., tank 702 on the computing device 112 of the industrial automation system 100. The legacy HMI graphics 114 also illustrates a graphical form of other industrial objects including an arrow headed process lines 704-706 (pointing downwards), processing lines, connection lines and any textual data associated with the industrial objects on the computing device 112 of the industrial automation system 100.

The legacy HMI graphics 114 is transmitted (as an input) to the HMI migration tool 116 for the purpose of the HMI migration. The output from the HMI migration tool 116 can be represented as the migrated HMI graphics 118 (as illustrated in FIG. 7B).

Referring to FIG. 7B, the migrated HMI graphics 118 illustrates a migrated graphical form of the industrial objects 102. As seen, the industrial object i.e., tank 702 is missing and discrepancies in the arrow headed process lines 704-706 (pointing upwards) in the migrated HMI graphics 118.

As detailed above, the HMI graphic object detection model 120 creates bounding boxes 708 and 710 in place of the default objects/placeholder indicating the missing tank 702 and discrepancies in the arrow headed process lines 704-706. The HMI graphic object detection model 120 then performs the 1-to-1 mapping to identify the correct objects to be placed in the migrated HMI graphics 118 using the machine learning techniques and historic HMI labelled dataset 207 (comprising the plurality of HMI labelled images of the industrial objects).

Once the correct industrial object, to be placed on the migrated HMI graphics 118, is identified the HMI graphic object detection model 120 replaces/restores the placeholders with the correct industrial object on the migrated HMI graphics 118. For example, referring to FIG. 7C, the missing tank 702 and the discrepancies in the arrow headed process lines 704-706 replaces the placeholder/default object of the bounding boxes 708 and 710. The corrected HMI graphics 122 is then transmitted for the further addition/inspection (to meet the additional client requirements) and to constitute the target HMI graphic.

Figure 6C:
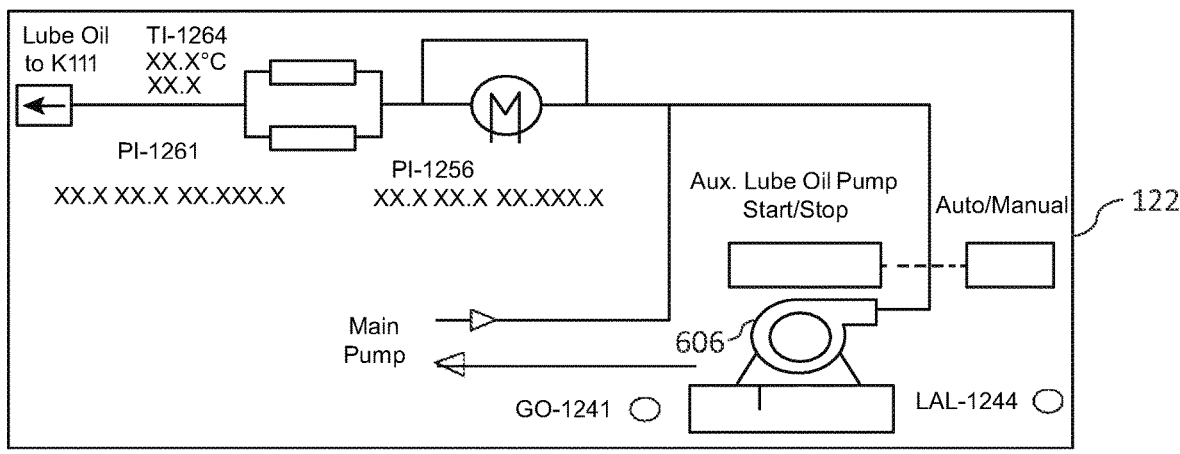
Figure 8A:
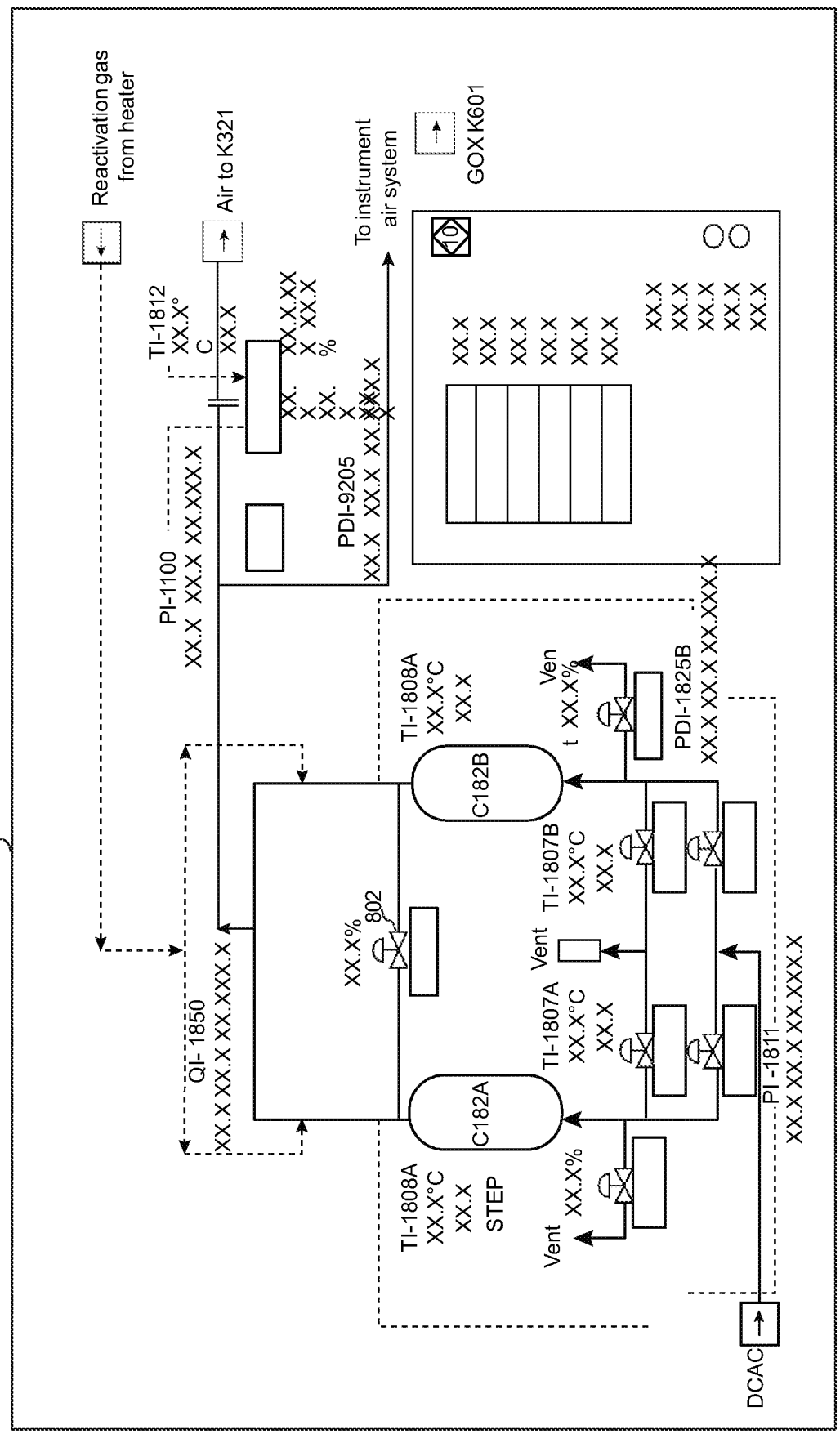
Figure 8B:
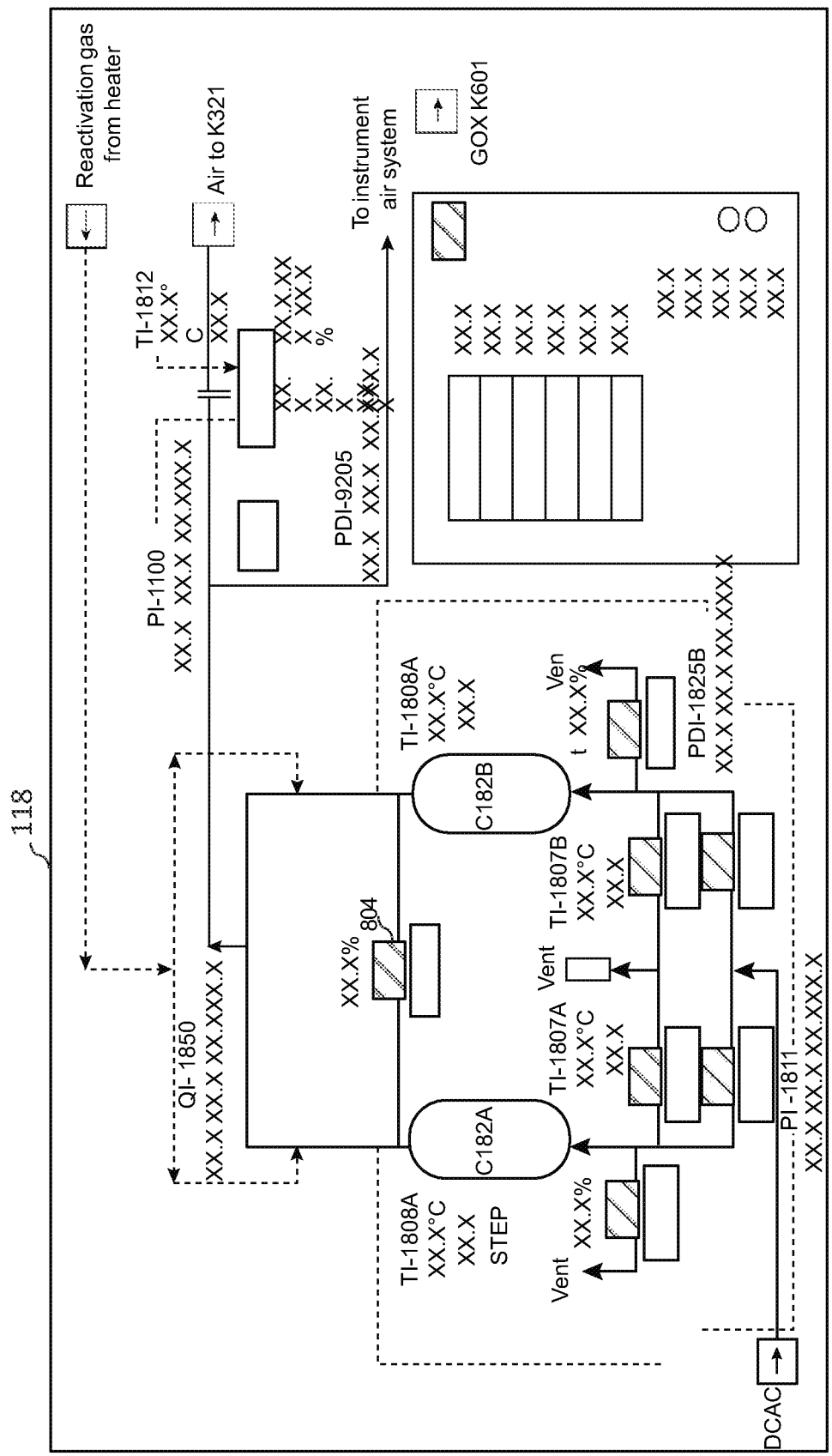
Figure 8C:
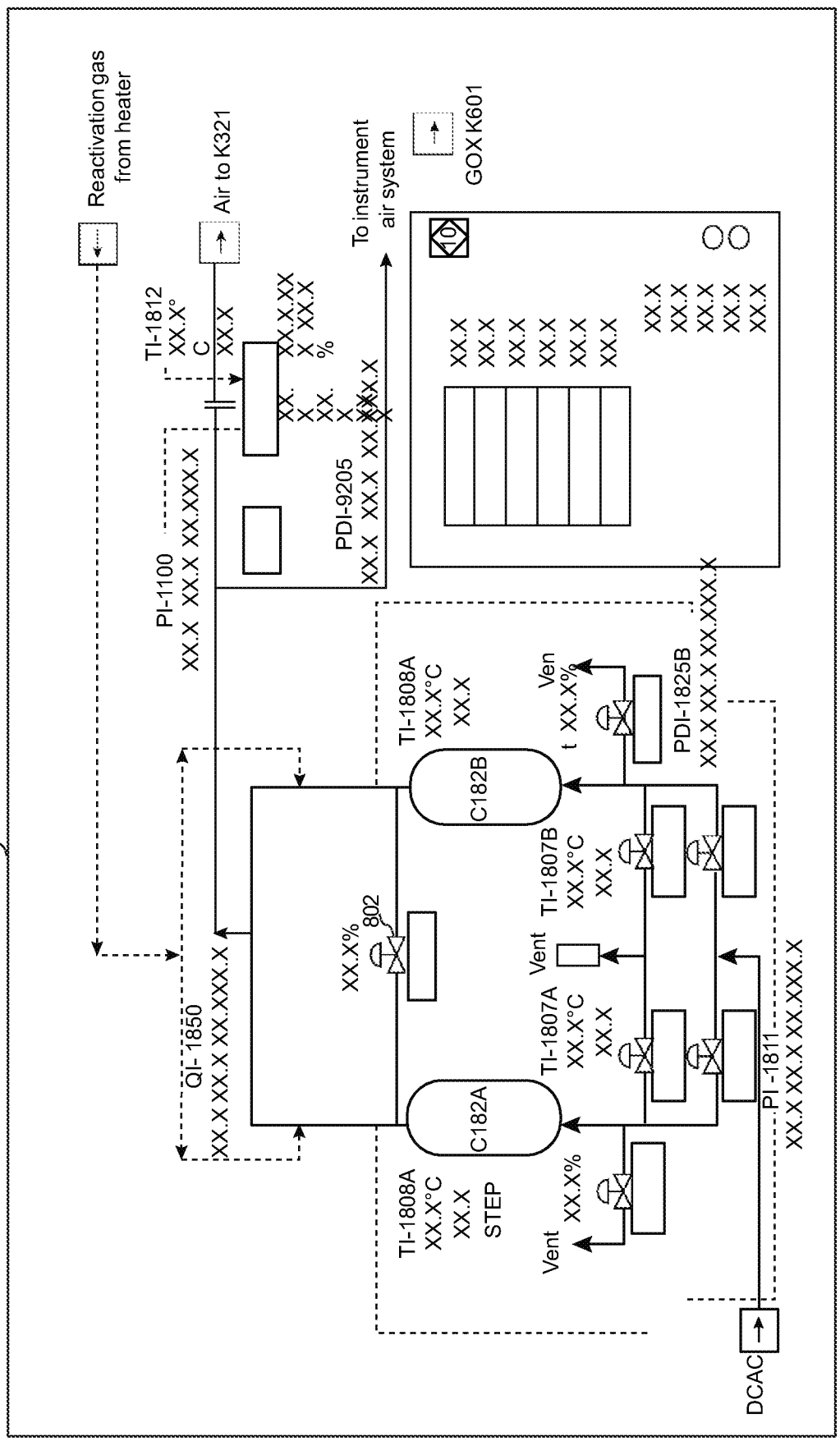

Similar operations performed in FIGS. 6A-6C are repeated for correcting the HMI graphics illustrated in FIGS. 8A-8C. Referring to FIG. 8A, the legacy HMI graphics 114 comprising a graphical form of an industrial objects i.e., control valves 802 & KV-1804A and MOL. SIEVE CONTROL with text buttons and their values is displayed on the computing device 112 of the industrial automation system 100.

The legacy HMI graphics 114 is transmitted (as an input) to the HMI migration tool 116 for the purpose of the HMI migration. The output from the HMI migration tool 116 can be represented as the migrated HMI graphics 118 (as illustrated in FIG. 8B).

Referring to FIG. 8B, the migrated HMI graphics 118 illustrates a migrated graphical form of the control valves 802 and text buttons along with their values are missing in the migrated HMI graphics 118.

As detailed above, the HMI graphic object detection model 120 creates bounding boxes 804 in place of the default objects/placeholder indicating the missing control valves 802 and text buttons along with their values in the migrated HMI graphics 118. The HMI graphic object detection model 120 then performs the 1-to-1 mapping to identify the correct objects to be placed in the migrated HMI graphics 118 using the machine learning techniques and historic HMI labelled dataset 207 (comprising the plurality of HMI labelled images of the industrial objects).

Once the correct industrial object, to be placed on the migrated HMI graphics 118, is identified the HMI graphic object detection model 120 replaces/restores the placeholders with the correct industrial object on the migrated HMI graphics 118. For example, referring to FIG. 8C, the missing control valves 802 and text buttons along with their values replaces the placeholder/default object of the bounding box 804. The corrected HMI graphics 122 is then transmitted for the further addition/inspection (to meet the additional client requirements) and to constitute the target HMI graphic.

Thus, as discussed above on FIGS. 6-8, the present invention provides an automatic verification and correction of any discrepancy in the migrated HMI graphics 118 that significantly saves the production/developers time by reducing the manual effort to correct the HMI graphics.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A computer-implemented method for generating human machine interface, HMI, graphics associated with an industrial automation system implementing machine learning, the method being performed by a graphic object detection model, the method comprising:

receiving a migrated HMI graphics, wherein said migrated HMI graphics being obtained from a legacy HMI graphics and wherein said migrated HMI graphics comprises a plurality of industrial objects;

identifying at least one missing industrial object in said migrated HMI graphics using a historical HMI labelled dataset of the at least one industrial object, wherein the at least one industrial object comprises a graphical object and a data object;

correcting the migrated HMI graphics to include said at least one missing industrial object;

generating a corrected HMI graphics comprising said at least one missing industrial object; and
transmitting a notification indicating the corrected HMI graphics to a computing device.

2. The computer-implemented method according to claim 1, wherein identifying said at least one missing industrial object in said migrated HMI graphics comprises:
identifying said at least one industrial object in said migrated HMI graphics and legacy HMI graphics using an object recognition technique;
determining differences between said identified industrial object in the legacy HMI graphics and said identified industrial object in the migrated HMI graphics; and
identifying said at least one missing industrial object in the migrated HMI graphics based on said determined differences and using the historical HMI labelled dataset of the at least one industrial object.

3. The computer-implemented method according to claim 1, wherein identifying said at least one missing industrial object in said migrated HMI graphics comprises:
obtaining at least one placeholder in the migrated HMI graphics;
detecting location of said at least one missing industrial object in the migrated HMI graphics based on said at least one place holder; and
creating at least one bounding box around at the at least one identified placeholder.

4. The computer-implemented method according to claim 3, wherein said at least one bounding box is created using a template matching and an image processing.

5. The computer-implemented method according to claim 1, further comprising:
evaluating said at least one identified missing industrial object using a one-to-one mapping between said plurality of industrial objects; and
including the at least one missing industrial object on the at least one respective placeholder of the migrated HMI graphics.

6. The computer-implemented method according to claim 1, wherein a scene-text recognition technique is used to identify the missing industrial object.

7. The computer-implemented method according to claim 1, wherein said notification comprises at least one of text notification, sound notification, and a graphical notification and wherein said historical HMI labelled dataset comprises a plurality of HMI labelled images of the at least one industrial objects.

8. The computer-implemented method according to claim 1, wherein said at least one missing industrial object indicates that at least one industrial object is missed in a scene of the migrated HMI graphics.

9. An industrial automation system implementing machine learning for generating human machine interface, HMI, graphics, wherein the industrial automation system comprising:
a processing unit;
a memory communicatively coupled to the processing unit; and
a graphic object detection model communicatively coupled to the processing unit and the memory, the graphic object detection model configured to:
receive a migrated HMI graphics, wherein said migrated HMI graphics being obtained from a legacy HMI graphics and wherein said migrated HMI graphics comprises at least one industrial object,
identify at least one missing industrial object in said migrated HMI graphics using a historical HMI labelled dataset of the at least one industrial object, wherein the at least one industrial object comprises a graphical object and a data object,
correct the migrated HMI graphics to include said at least one missing industrial object,
generate a corrected HMI graphics comprising said at least one missing industrial object, and
transmit a notification indicating the corrected HMI graphics to a computing device.

10. The industrial automation system according to claim 9, wherein the graphic object detection model configured to identify said at least one missing industrial object in said migrated HMI graphics comprises:
identifying said at least one industrial object in said migrated HMI graphics and legacy HMI graphics using an object recognition technique;
determining differences between said identified industrial object in the legacy HMI graphics and said identified industrial object in the migrated HMI graphics; and
identifying said at least one missing industrial object in the migrated HMI graphics based on said determined differences and using the historical HMI labelled dataset of the at least one industrial object.

11. The industrial automation system according to claim 9, wherein the graphic object detection model configured to identifying said at least one missing industrial object in said migrated HMI graphics comprises:
obtaining at least one placeholder in the migrated HMI graphics;
detecting location of said at least one missing industrial object in the migrated HMI graphics based on said at least one place holder; and
creating at least one bounding box around at the at least one identified place holder.

12. The industrial automation system according to claim 9, wherein the graphic object detection model is further configured to:
evaluate said at least one identified missing industrial object using a one-to-one mapping; and
include the at least one missing industrial object on the at least one respective placeholder of the migrated HMI graphics.

13. The industrial automation system according to claim 12, wherein a scene-text recognition technique is used to identify the missing industrial object.

14. The industrial automation system according to claim 9, wherein said notification comprises at least one of text notification, sound notification, and a graphical notification and wherein said historical HMI labelled dataset comprises a plurality of HMI labelled images of the at least one industrial objects.

15. A computer program product comprising a non-transitory computer readable medium, having thereon a computer program comprising program instructions, the computer program being loadable into a graphic object detection model and configured to cause execution of a method when the computer program is run by the graphic object detection model, the method being caused to be executed comprising:
receiving a migrated HMI graphics, wherein said migrated HMI graphics being obtained from a legacy HMI graphics and wherein said migrated HMI graphics comprises a plurality of industrial objects;
identifying at least one missing industrial object in said migrated HMI graphics using a historical HMI labelled dataset of the at least one industrial object, wherein the at least one industrial object comprises a graphical object and a data object;
correcting the migrated HMI graphics to include said at least one missing industrial object;
generating a corrected HMI graphics comprising said at least one missing industrial object; and
transmitting a notification indicating the corrected HMI graphics to a computing device.

\* \* \* \* \*